United States Patent [19]

Kerr

[11] Patent Number: 4,656,882
[45] Date of Patent: Apr. 14, 1987

[54] INCREMENTALLY VARIABLE SINGLE COUNTERSHAFT TRANSMISSION

[76] Inventor: John H. Kerr, P.O. Box 40, R.R. 1, Kingston, Ontario, Canada, K7L 4V1

[21] Appl. No.: 728,306

[22] Filed: Apr. 29, 1985

[30] Foreign Application Priority Data

May 29, 1984 [CA] Canada ................... 455342

[51] Int. Cl.$^4$ .......................... F16H 5/06; F16H 3/08
[52] U.S. Cl. ..................... 74/337.5; 74/363; 74/375
[58] Field of Search ............... 74/362, 363, 375, 337.5, 74/745

[56] References Cited

U.S. PATENT DOCUMENTS

| 2,019,923 | 11/1935 | Molly ................... 74/343 |
| 2,660,070 | 11/1953 | Magis ................... 74/337.5 |
| 3,273,413 | 9/1966 | Stobbe et al. ........... 74/339 X |
| 3,491,862 | 1/1970 | Tanzer .................. 74/337.5 X |
| 3,864,990 | 2/1975 | Lacoste ................. 74/745 X |
| 3,954,021 | 5/1976 | Mraz .................... 74/337.5 X |

FOREIGN PATENT DOCUMENTS

| 696915 | 11/1964 | Canada . |
| 720214 | 10/1965 | Canada . |
| 1038202 | 9/1978 | Canada . |
| 608540 | 12/1924 | France ................... 74/337.5 |
| 712933 | 10/1931 | France ................... 74/337.5 |
| 1333777 | 12/1963 | France ................... 74/745 |

OTHER PUBLICATIONS

"Winning Gear", Fersen, Autocar, 5/1966, pp. 1038-1039.

Primary Examiner—Leslie Braun
Assistant Examiner—D. Wright
Attorney, Agent, or Firm—Birch, Stewart, Kolasch & Birch

[57] ABSTRACT

By making the ratios of the gear pairs in a conventional single countershaft transmissions a particularly defined sequence, and mounting the gear elements that are not affixed to the countershaft so that, that of the first gear pair is free to rotate on and couplable to the input shaft, that of the second gear pair is free to rotate on the output shaft and couplable to both the input and output shafts, with those of the remaining pairs free to rotate on and couplable to the output shaft, the number of ratios in the transmission will be enhanced by a factor of two (2) and the continuum will be in a particular geometric progression. By extending the particularly defined ratio sequence to a series arrangement of similarly constructed gearboxes, the number of continuum ratios in the resulting transmission will be enhanced by a factor of three (3) to five (5) and the continuum will again be of the same geometric progression.

5 Claims, 11 Drawing Figures

INCREMENTALLY VARIABLE SINGLE COUNTERSHAFT TRANSMISSION

BACKGROUND OF THE INVENTION (i) Field of the invention

The present invention relates to manual countershaft transmissions that are used in road and off-road vehicles, machinery, and other drive applications where there is a need to alter either the torque or the speed of the output from a prime mover.

(ii) Description of the Prior Art

The structures of present manual countershaft transmissions incorporate one gear-pair for each selectable ratio, with the gear-pairs selected independently either in or out of continuum. This method of selecting the ratio changes in countershaft transmissions requires a large number of gear-pairs and relatively complex selecter mechanisms when more than five ratios are required.

The following patents reflect the state-of-the-art techniques used to select the ratios in present manual countershaft transmissions:

U.S. Pat. No. 2,019,923 "Change Speed Gearing" Molly-Patented Nov. 5, 1935.

Can Pat. No. 720,214 "Gear Changing Mechanism" Gronau-Oct. 26, 1965.

U.S. Pat. No. 3,273,413 "Transmission with Automatic Meshing Control" Stobbe & Zankl-Patented Sept. 20, 1966.

Can. No. Pat. 1,038,202 "Variable Ratio Gear Transmission" Keller-Sept. 12, 1978.

Can Pat. No. 696,915 "Geometrically Progressive Gear Box" Feuillastre Feb. 6, 1960.

U.S. Pat. No. 3,491,862 "Transmission Ratio Control For A Tractor Drivetrain" Tanzer-Patented Jan. 27, 1970.

SUMMARY OF THE INVENTION (i) Aim of the Invention

The aim of the invention is to incorporate a selective order of mutual dependency between the sequence of gear-pairs of countershaft transmissions that will achieve the greatest number of ratios for any given number of gear-pairs.

One aspect of the invention is to provide herein single countershaft structured transmissions, comprising of a sequence of gear-pairs with one gear element of each pair fixed to the countershaft so that either the 1st or 2nd pair can be coupled to the input shaft, and so that the remaining pairs can be independently coupled to the output shaft, with a selecter mechanism that provides a mutual dependent order in the combinations of gear-pairs to obtain a maximum number of ratios for any given number of gear-pairs in the transmission.

A second aspect of the invention is to provide herein series structured transmissions comprising of two or more single countershaft structures, with the ratios of each structure permuted in combinations of product to obtain a maximum number of ratios for the given number of gear-pairs in the transmission.

(ii) Principle of the Invention

The mutually dependent logic that directs the ratio changes in the disclosed single countershaft structures is readily described in terms of a two element pure binary system of the same order.

| Element | | | Pairs | | |
|---|---|---|---|---|---|
| 1st | 2nd | | 1st | 2nd | |
| Weights | | | Weights | | |
| 1 | 2 | VALUE | X^1 | X^2 | RATIO |
| 1 | 1 | 3 | 1 | 1 | X^3 |
| 0 | 1 | 2 | 0 | 1 | X^2 |
| 1 | 0 | 1 | 1 | 0 | X^1 |
| 0 | 0 | 0 | 0 | 0 | X^0 |

The two gear-pairs like the elements, have two states as indicated by the numbers 1 and 0, with their order of mutual dependency shown in the table. However, unlike the pure binary system where the elements have either a weighted or zero value, continuum through the gear-pairs in the transmission have a kinematic value either equal to $X^n$ or one, where n is the equivalent weighted value of the pure binary system.

(iii) Kinamatic Description of the Invention

Consider a manual single countershaft transmission consisting of a sequence of gear-pairs with a structure that is generically represented by the following schematic flow diagram, where binary switches 1st, 2nd, etc., represent sliding dog couplers, the squares represent the gear-pairs, and the solid lines show the alternate continuum paths in the transmission.

Input to the transmission can be multiplied by either $X*y$ or $y$ to the countershaft by selecting the appropriate position of the 1st binary switch, and in combinations of permuted product with each of the other gear-pairs $X^8/y$, $X^6/y$, $X^4/y$, $X^2/y$, or $1/y$ in the sequence from the countershaft to the output shaft, providing the following ratio-states $X^9$, $X^8$, $X^7$, $X^6$, $X^5$, $X^4$, $X^3$, $X^2$, $X$, and 1, in the continuum of the transmission. For a given input speed, output speed will increase from a value less than input when the value of X is less than one, and decrease from a value greater than input when the value of X is greater than one, providing either an output speed increasing or an output speed decreasing transmission.

The ratio-states in any similarly structured countershaft transmission with any number of gear-pairs, can be expressed by the following equation:

$$r_{1,2,3,\ldots r} = y[X]_0^1 * [X^2/y]_0^1 \text{ or } \frac{X^{[2(n-1)-2]4N}}{y} \qquad (1)$$

where: $r_{1,2,3,\ldots r}$ are the ratios of the transmission, y is the ratio of the second gear-pair, X is the basic increment of change in the ratios, and n is the nth gear-pair with limits of 4 to N. The first and second expressions in the equation affirms the two ratios between the input shaft and countershaft and between the countershaft and output shaft as caused by the 1st and 2nd sliding dog coupler, while the third expression affirms the ratio between the countershaft and output as caused by each of the remaining sliding dog couplers in the transmission.

It follows from equation (1) that a transmission with three gear-pairs would have $X^3$, $X^2$, $X^1$, and $X^0$ as ratio-states, while a transmission with four gear-pairs would have $X^5$, $X^4$, $X^3$, $X^2$, $X^1$, and $X^0$ as ratio-states. Therefore, the nunber of ratios T in any similarly structured transmission with N gear-pairs is:

$$T = 2[N - 1]3^N; \quad (2)$$

and the basic increment of change X in the ratios of any similarly structured countershaft transmission with T ratios and a maximum overall ratio of R, is expressed by;

$$X = R^{(1/T-1)} \quad (3)$$

From the above discussions it is clear that an incrementally variable single countershaft transmissions may comprise any number of gear-pairs greater than two. Although as a gear mechanism it is not essential that the 1st, 3rd, and subsequent gear-pairs in the sequence have ratios that are a power of the basic increment of change X and either a multiple or a division of the ratio y, values so obtained will ensure equal decrements and non-duplication of ratios in the transmission.

(e) Other Features of the Invention

Consider two quadriratio single countershaft transmissions arranged in series, with a structure that is generically represented by the following schematic flow diagram, where again the binary switches represent sliding dog couplers, the squares represent the gear-pairs, and the solid lines show the alternate continuum paths in the transmission.

Accordingly, input to the transmission can be multiplied by either $X^3$, $X^2$, X, or 1, in the first quadriratio structure, and by either $X^{12}$, $X^8$, $X^4$, or 1 in the second quadriratio structure, resulting in the following sixteen ratio-states in the continuum of the transmission, $X^{15}$, $X^{14}$, $X^{13}$, $X^{12}$, $X^{11}$, $X^{10}$, $X^9$, $X^8$, $X^7$, $X^6$, $X^5$ $X^4$, $X^3$, $X^2$, X and 1. Again, with X less than one output speed will decrease and with X greater than one output speed will increase.

The number of ratios $T_s$ in any series arrangement of single countershaft structured transmissions is given by the product of the ratios $T_u$ in each of the individual structures, as shown by the expression:

$$T_s = T_1 * T_2 * \ldots T_{u-1} * T_u \quad (4)$$

Accordingly, a series of three quadriratio structures would have $4*4*4 = 64$ ratios, a series of one quadriratio and one hexaratio structure would have $4*6 = 24$ ratios, two hexaratio structures would have $6*6 = 36$ ratios, and three hexaratio structures would have $6*6*6 = 216$ ratios, etc.

The required ratios of the 1st, 3rd, and subsequent gear-pairs of any added structure in any series arrangement is perhaps best shown by the following array, where the ratios of a first hexaratio structure are shown sequentially along the ordinate, and the ratios of a second hexaratio structure are shown sequentially along the co-ordinate.

```
X⁵ ─┐   X⁵   X¹¹  X¹⁷  X²³  X²⁹  X³⁵
X⁴ ─┤   X⁴   X¹⁰  X¹⁶  X²²  X²⁸  X³⁴
X³ ─┤   X³   X⁹   X¹⁵  X²¹  X²⁷  X³³
X² ─┤   X²   X⁸   X¹⁴  X²⁰  X²⁶  X³²
X  ─┤   X    X⁷   X¹³  X¹⁹  X²⁵  X³¹
1  ─┘   1    X⁶   X¹²  X¹⁸  X²⁴  X³⁰
         │    │    │    │    │    │
         1   X⁶   X¹²  X¹⁸  X²⁴  X³⁰
```

The thirty-six ratios of the transmission vary from $X^{35}$ to 1 by even decrements of X. The required ratios of the second structure vary from $X^{30}$ to $X^6$ by even decrements of $X^6$. The required ratios expressed as a function of X, for the 1st, 3rd, and 4th gear-pairs of the second structure are respectively, $X^6$, $X^{12}$, and $X^{24}$. This is deduced from expression (1) which shows that the second, third, and every second consecutive ratio thereafter from ratio unity in a single countershaft structure results from the gear-pairs that change the ratio between the countershaft and output shaft.

Accordingly, the ratios of the 1st, 3rd and subsequent gear-pairs of any added structure can be obtained by substituting the value of X in equation (1) by, $$X_u{}^p = r_{u-1}{}^r * X \quad (5)$$

where: $X_u{}^p$ is the basic increment of change in the added structure u in the series arrangement, and $r_{u-1}{}^r$ is the maximum ratio in the series arrangement up to the addition of structure u−1. Accordingly, if a third hexaratio structure with a y ratio of one is added to the previously discussed series arrangement, the ratios of the 1st, 3rd, and 4th gear-pairs will be respectively:

$$X_3{}^p = X^{35} * X = X^{36}$$

$$X_3{}^{2p} = X^{72}$$

$$X_3{}^{4p} = X^{144}$$

BRIEF DESCRIPTION OF THE DRAWINGS

The following disclosure describes the many aspects of these novel transmissions and refer to the accompanying drawings, in which:

FIG. 3, is a skeletal diagram of a sixteen ratio series structured transmission combining two quadriratio structures similar to FIGS. 1 and 1a.

Figure 1:
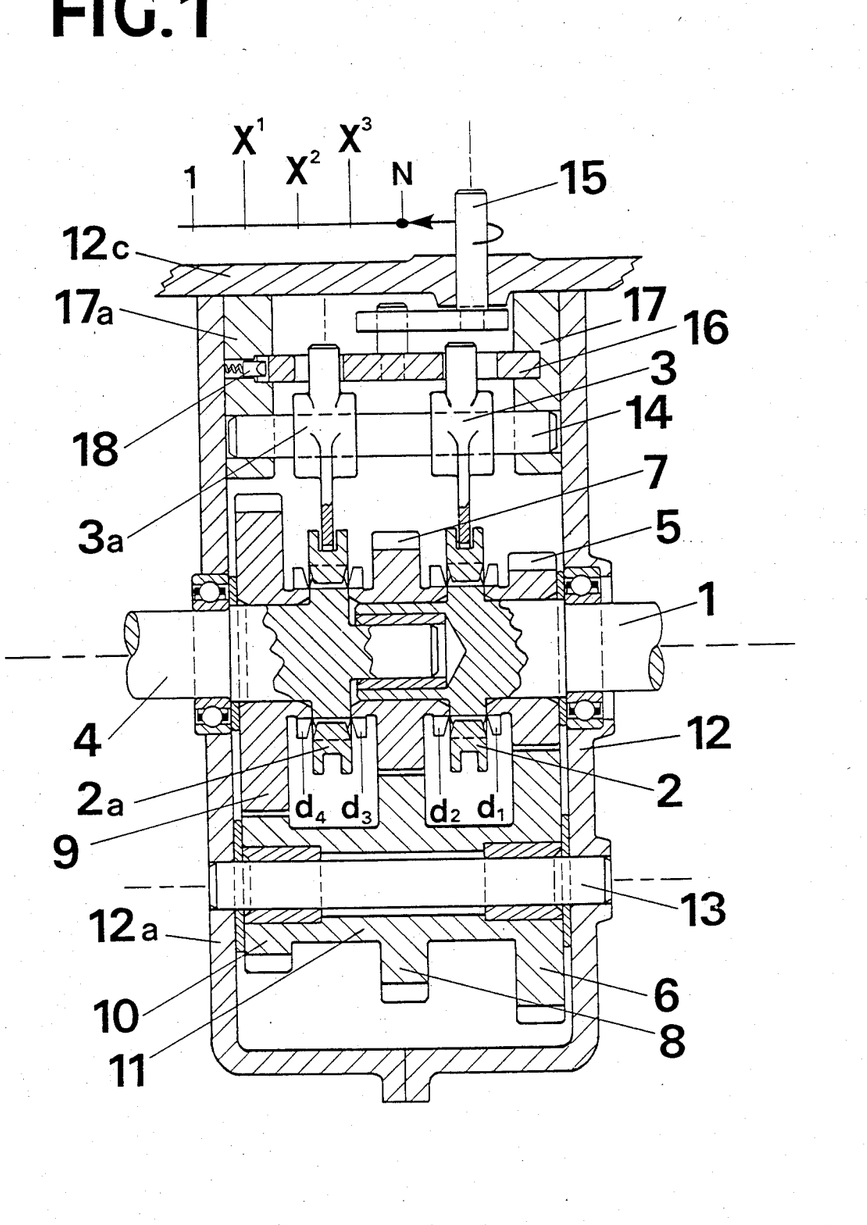
FIGS. 1 & 1a, are sectioned views showing the component parts of a quadriratio single countershaft transmission with the required two profiled slots in the shift gate of the selector mechanism.
Figure 1A:
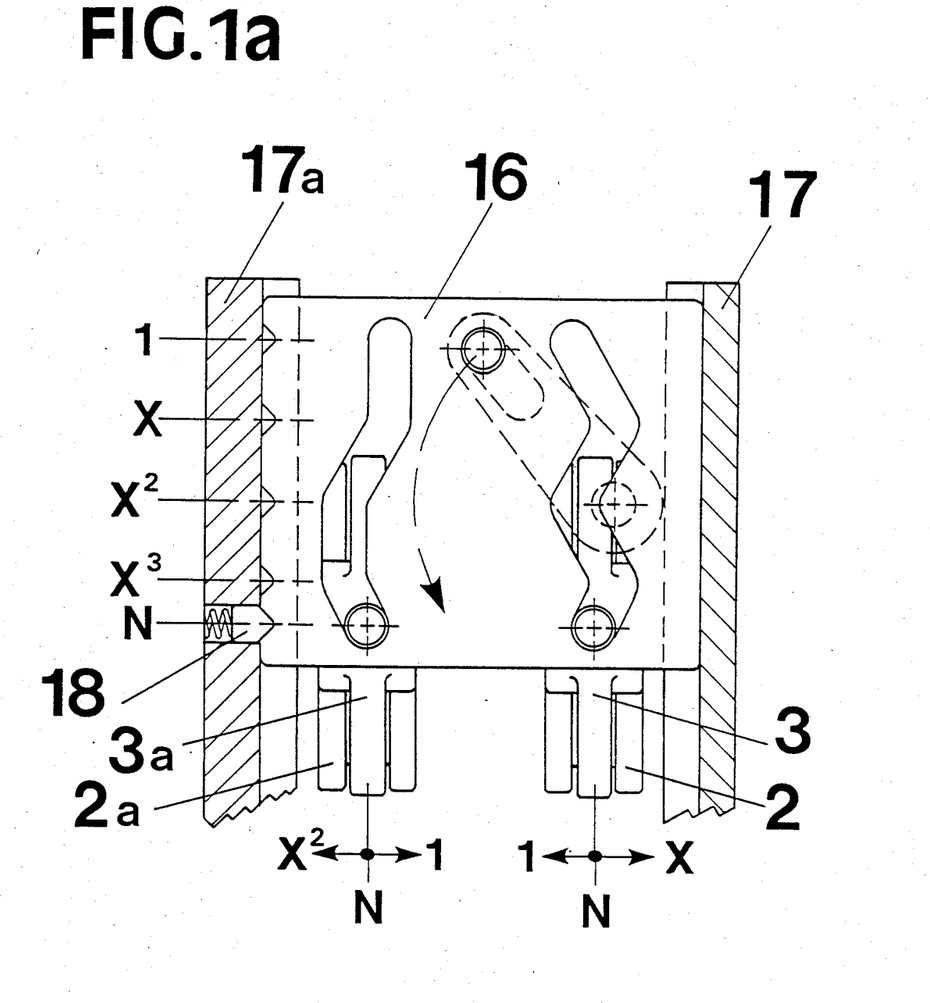

DESCRIPTION OF THE EMBODIMENTS OF THE INVENTION (i) Description of FIGS. 1, and 1a.

FIG. 1, shows a quadriratio single countershaft transmission, with sliding dog coupler 2 splined to, and axially movable on input shaft 1 so that either gear 5 of the pair 5-6, or gear 7 of the pair 7-8 can be selected, and with sliding dog coupler 2a splined to, and axially movable on output shaft 4 so that either gear 7 of the pair 7-8, or gear 9 of the pair 9-10 can be selected. Gears 5,7 and 9 are provided respectively with dogs d1, d2-d3, and d4, with gears 6, 8, and 10 fixed to cluster shaft 11 which is free to rotate on bearing rod 13 held between casing section 12 and 12a. Shift forks 3 and 3a are mounted on rod 14 and held to the casing with shift gate 16 by guide brackets 17 and 17a. Shift lever 15 is rotatable in casing cover 12c and provides the means of positioning shift gate 16. As shown in FIG. 1a, shift gate 16 incorporates two profiled slots that engages with shift forks 3 and 3a, and provide the binary order of mutual dependency between the combinations of gear-pairs in the continuum between the input and output shafts of the transmission. Spring and plunger 18 indent the position of shift gate 16.

As shift gate 16 is made to move from the neutral position as shown in FIGS. 1 and 1a when neither the input nor the output shaft is coupled to the gear-pairs, to the four other selectable positions, the continuum path between the input and output shafts will be sequentially through the following gear-pair combinations:

$$5/6 * 10/9 = X^3$$

$$7/8 * 10/9 = X^2$$

$$5/6 * 8/7 = X$$

$$7/8 * 8/7 = 1$$

The required basic increment of change X in the ratios of a quadriratio transmission with an overall ratio R of 3, can be derived from equation (3):

$$X = 3^{(1/[4-1])} = 3^{\frac{1}{3}} = 1.4422,$$

and the required ratios of the three gear-pairs in the transmission are derived from equations (1), and expressed as a function of both the basic increment of change X and the value of the ratio of the second gear-pair y accordingly:

| | gear-pairs | |
|---|---|---|
| 1st | 2nd | 3rd |
| X*y | y | X²/y |
| 0.7211 | .5 | 1.1602 |
| 1.4422 | 1.0 | 2.0801 |
| 2.1634 | 1.5 | 1.3867 |

When ratio y of the second gear-pair is one the ratio of the first gear-pair is X the value of the increment of change, and the value of the third gear-pair is equal to $X^2$. The ratios of the 1st and 3rd gear-pair are as shown in the table when the value of y of the second gear-pair is 0.5 and 1.5 respectively.

Figure 2:
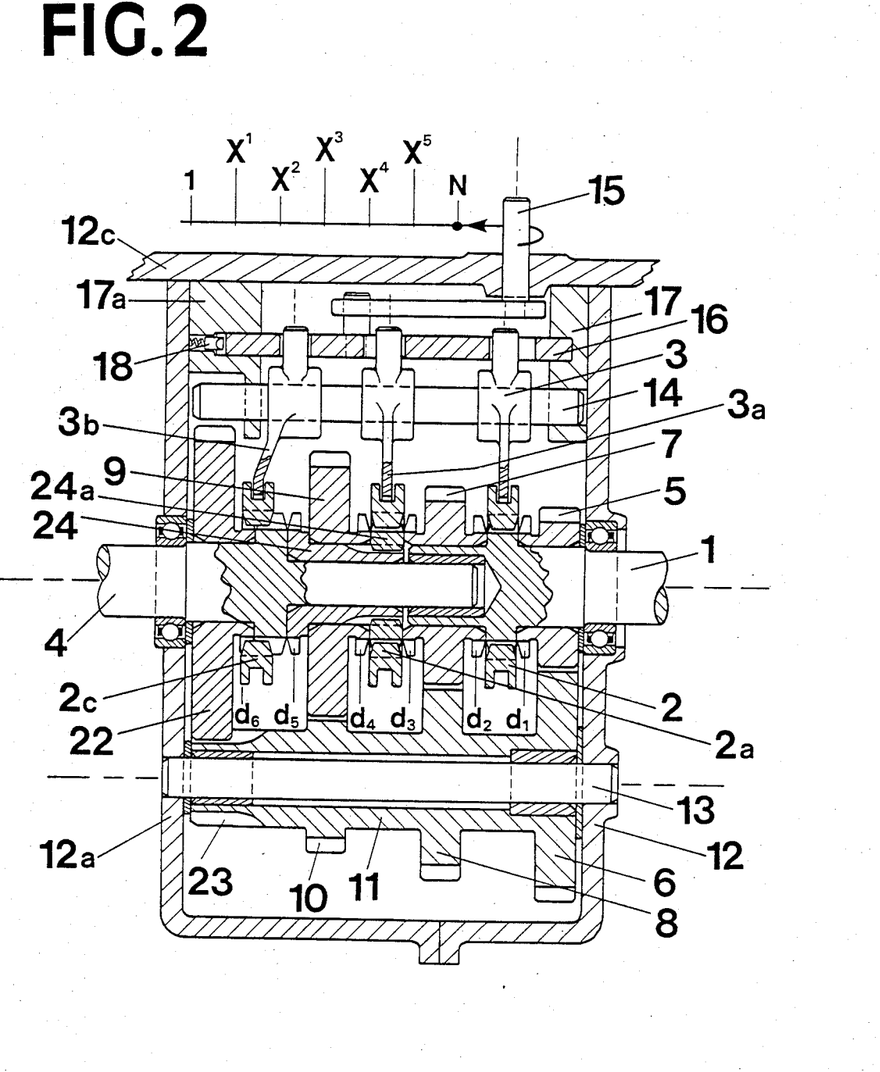
FIGS. 2 & 2a, are sectioned views showing the component parts of a hexaratio single countershaft transmission with the required three profiled slots in the shift gate of the selector mechanism.
Figure 2A:
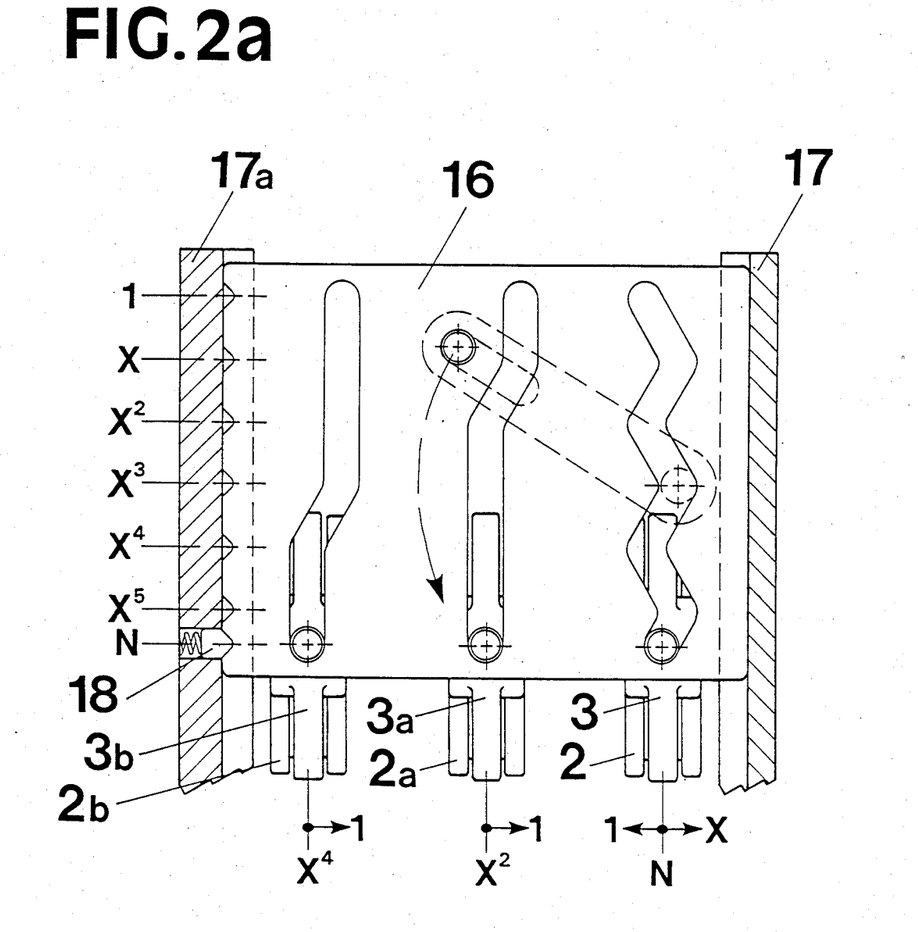

(ii) Description of FIGS. 2, and 2a.

FIG. 2, shows a hexaratio single countershaft transmission similar to the transmission of FIG. 1, but incorporating an additional gear-pair and extended shift mechanism. All parts are as identified in FIG. 1, with the following changes and parts added; gear 9 of the gear-pair 9-10 is now mounted to rotate freely on concentric shaft 24, which is provided with fixed dog d5 and splined to ring 24a with external and internal splines, and co-axially mounted and free to rotate on an extension to the output shaft 4 between sliding dog couplers 2a and 2b. Gear element 22 of added gear-pair 22-23 is provided with dog d6 and is mounted free to rotate on output shaft 4, with gear element 23 of the added pair 22-23 affixed to the cluster shaft 11. A third shift fork 3b and sliding dog coupler 2b is provided and activated by a third profiled slot on shift gate 16.

As shift gate 16 is made to move from the neutral position as shown in FIGS. 2a, when the output shaft 4 is coupled to gear element 22, concentric shaft 24 is coupled to gear element 9, and input shaft 1 is uncoupled from both gear elements 5 and 7, to the other six positions, the continuum path between the input and output shafts will be sequentially through the following gear-pair combinations:

$$5/6 * 23/22 = X^5$$

$$7/8 * 23/22 = X^4$$

$$5/6 * 10/9 = X^3$$

$$7/8 * 10/9 = X^2$$

$$5/6 * 8/7 = X$$

$$7/8 * 8/7 = 1$$

Again, for a transmission with a given maximum ratio R the basic increment of change X in the ratios can be obtained from equation (3) and the ratios of the four gear-pairs can be derived from equation (1), in the same manner as was shown in the case of the quadriratio transmission of FIG. 1.

Figure 3:
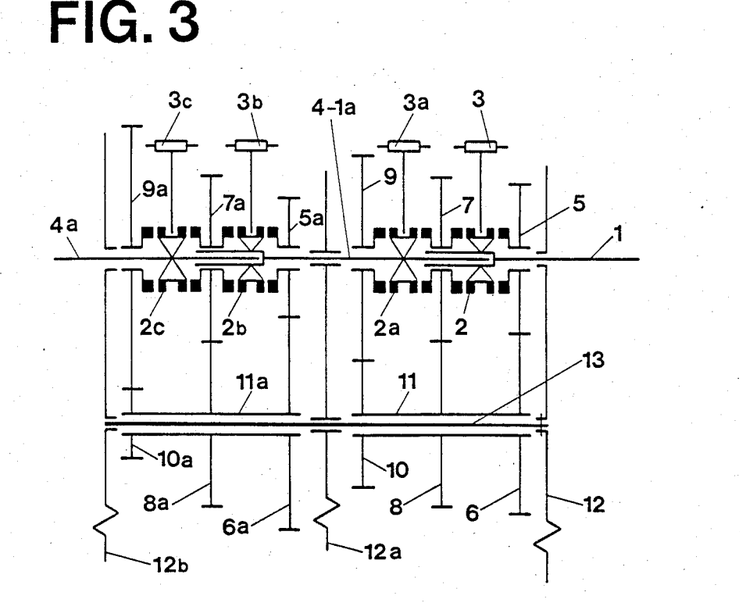

(iii) Description of FIG. 3.

FIG. 3 is a skeletal diagram showing a sixteen ratio series structured transmission consisting of two quadriratio single countershaft structures similar to FIG. 1 with all parts identified accordingly. Part 4-1a represents the interconnecting shaft between the two structures, and casing member 12b has been added. The independently operated shift levers and gates of the series structure are not shown, but those of the first structure are identical to that shown in FIG. 1a, with that of the second structure not requiring the neutral position in the profiled slots of either of the two shift forks.

With a maximum ratio of R, the basic increment of change X between the sixteen ratios can be obtained from equation (3), the required ratios of the gear-pairs in the first structure can be obtained from equation (1), and the required ratios of the gear-pairs in the second structure can be obtained by substituting the value of X in equation (1) with the basic increment of change of the second structure obtained from equation (5). Accordingly, if the ratio y is equal to one in both structures, the ratios of the three gear-pairs in each of the structures will be respectively, X, 1 and $X^2$; and $X^4$, 1 and $X^8$; and the ratio-states in each structure are respectively $X^3$, $X^2$, X and 1, and $X^{12}$, $X^8$, $X^4$ and 1, and the permutation of these ratios will result in sixteen ratios varying from $X^{15}$ to 1 with even decrements of X.

Operation of the series structure begins with the selector lever of the first structure in the neutral position and that of the second structure in the $X^{12}$ position, with continuum between the input and output shaft interupted for engine start-up. Ratio $X^{15}$ to $X^{12}$ are made active by selecting the four sequenced ratios in the first structure. Ratios $X^{11}$ to $X^8$ are made active by selecting ratio-state $X^8$ in the second structure in combination once again with the four sequenced ratios in the first structure. This procedure is again repeated with ratio-states $X^4$ and 1 of the second structure to make active all remaining ratios $X^7$ to $X^0$ in this series structured transmission.

Figures 4A, 4B:
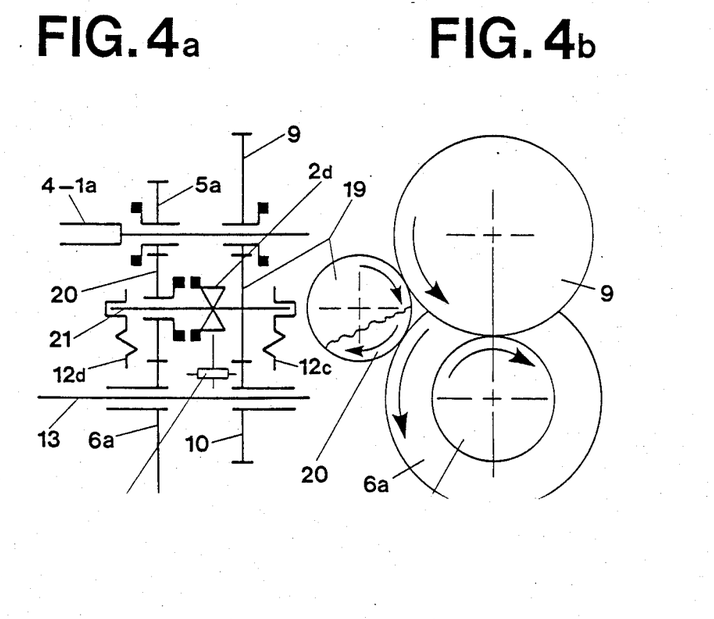
FIGS. 4a and 4b, is a skeletal diagram showing a reverse gear set arrangement for the series structured transmission of FIG. 3.

(iv) Description of FIG. 4.

FIGS. 4a and 4b, are skeletal diagrams showing respectively the side and front view of a reverse gear arrangement for the series structured transmission of FIG. 3. Shaft 21 is fixed to reverse gear element 19 in mesh with gear element 9 of the first structure, with gear element 20 mounted free to rotate in mesh with gear element 6a of the second structure, and journalled free to rotate in a side extension 12c-12d of the transmission casing that together with sliding dog coupler and fork 2d-3d provide the means of activating a reversed continuum in the transmission.

Figure 7:
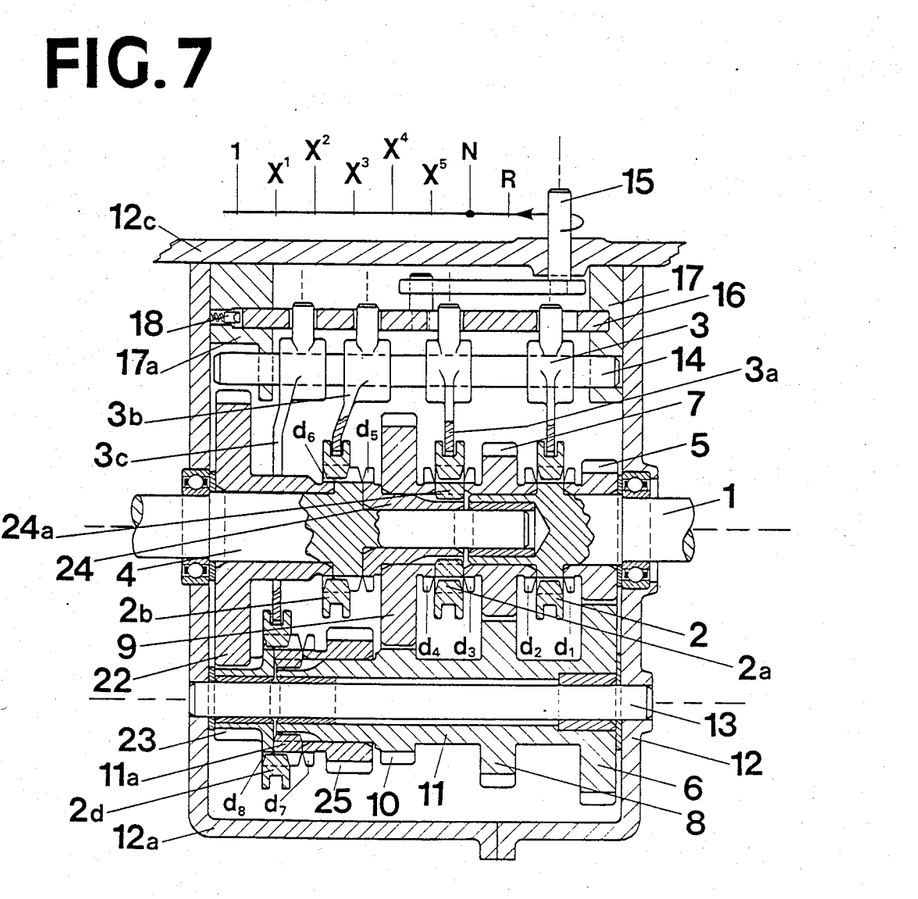
FIGS. 7 & 7a, are sectioned views of a six forward, two reverse ratio single countershaft transmission similar to FIG. 2, with a reverse gear set and the required four profiled slots in the shift gate of the selector mechanism.
Figure 7A:
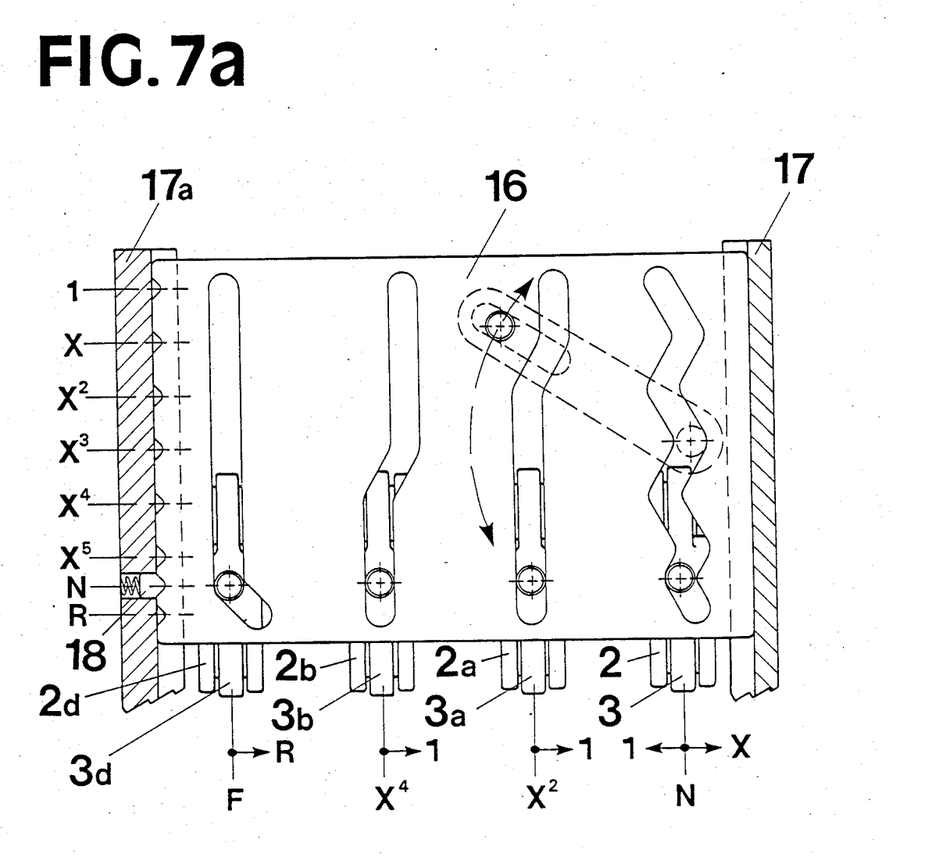

Reverse is made active when gear element 20 is coupled to shaft 21 and selecting either of two added reverse position on the shift gate with profiled slots extended to make active either gear-pair 5-6 or gear-pair 7-8 as shown in the reverse arrangement of FIG. 7a of the first structure, with the second slot extended as in the neutral position of FIG. 1a so that interconnecting shaft 4-1a remains inactive during a reverse selection. Accordingly, the two reverse ratios are active when input to the transmission is directed to either gear-pair 5-6 or 7-8 in the first structure, with continuum from the countershaft 11 of the first structure to the output shaft 4a of the second structure through the following gear-pairs, 9-19, 20-6a, 10a-9a.

Figure 5:
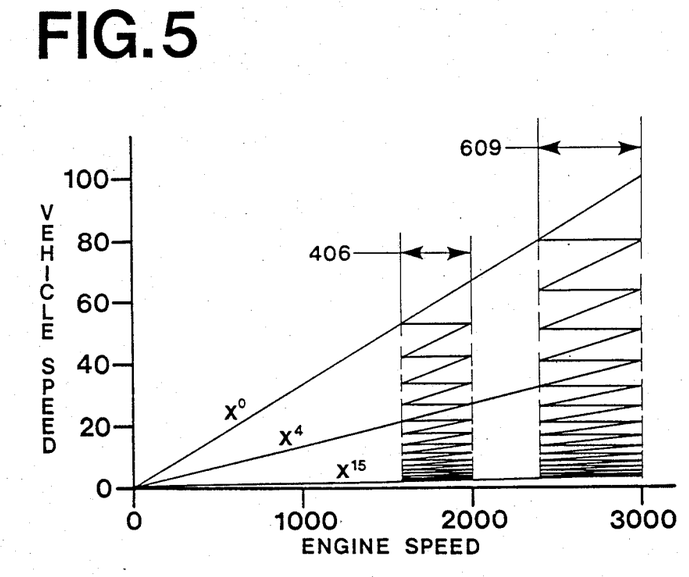
FIG. 5, is a graph showing the projected relationship between the speed of a road vehicle and that of the engine over two engine operating regimes, with the transmission of FIG. 3 installed.

(v) Description of FIG. 5.

FIG. 5, show a graph of the projected unbroken relationship between ground and engine operating speed for the series structured sixteen ratio transmission of FIG. 3 for a vehicle installation where engine speed is not maintained constant and the maximum ratio of the transmission is sixteen. Accordingly, the value of X as derived from equation (3) is 1.203 and while operating the engine in the two operating regimes shown of 3000 and 2000 rpm, an up-shift in ratio of the transmission will require that engine speed falls 609 rpm and 406 rpm respectively if it is assumed that the vehicle is inertially stable during the up-shifts. This is derived from the expression $100(X-1)\% = 100(1.203-1) = 20.3\%$ of engine operating speed.

The required ratios of the gear-pairs for both quadriratio structures is determined as follows:

(1) the basic increment of change X in the ratios, can be obtained from equation (3):

$$X = 16^{(1/[16-1])} = 1.203$$

(2) the ratios of the gear-pairs in both structures can be obtained from equation (1) with the basic increment of change of the ratios in the second structure obtained from equation (5), and with ratio y in both structures equal to 31/30 the ratios of the six gear-pairs will be:

1st $X * y = 1.243$ or 41/33

2nd $31/30 = 1.033$

3rd $X^2/y = 1.401$ or 42/30

4th $X^4 * y = 2.164$ or 39/18

5th $31/30 = 1.033$

6th $X^8/y = 4.246$ or 51/12

(3) the following table gives the order in the selection of the gear-pairs for both quadriratio structures, and the incremental ratios in terms of both a decimal value and as a function of X, as the transmission changes from 16:1 to 1:1.

| Gear pair | | | | | | Transmission Ratio | |
|---|---|---|---|---|---|---|---|
| Q-1 | | | Q-2 | | | | |
| 1 | 2 | 3 | 4 | 5 | 6 | f(X) | Actual |
| * | 0 | * | * | 0 | * | X^15 | 16.017 |
| 0 | * | * | * | 0 | * | X^14 | 13.321 |
| * | / | 0 | * | 0 | * | X*13 | 11.072 |
| 0 | 0 | 0 | * | 0 | * | X^12 | 9.208 |
| * | 0 | * | 0 | * | * | X*11 | 7.639 |
| 0 | * | * | 0 | * | * | X^10 | 6.353 |
| * | / | 0 | 0 | * | * | X*9 | 5.280 |
| 0 | 0 | 0 | 0 | * | * | X*8 | 4.392 |
| * | 0 | * | * | / | 0 | X*7 | 3.647 |
| 0 | * | * | * | / | 0 | X*6 | 3.033 |
| * | / | 0 | * | / | 0 | X*5 | 2.521 |
| 0 | 0 | 0 | * | / | 0 | X*4 | 2.097 |
| * | 0 | * | 0 | 0 | 0 | X*3 | 1.739 |
| 0 | * | * | 0 | 0 | 0 | X*2 | 1.447 |
| * | / | 0 | 0 | 0 | 0 | X*1 | 1.202 |
| 0 | 0 | 0 | 0 | 0 | 0 | X*0 | 1.000 | where: Q-1 and Q-2 are respectively the quadriratio structures with the first, second, and third gear-pair of each indicated by the numbers 1, 2, 3, and 4, 5, 6; * and / in the column indicates that the gear-pair is active and that either a multiple or a division of the ratio is required, and 0 indicating that the pair is inactive. The actual values are obtained by multiplying or dividing as indicated in the binary table, the ratio of the number of teeth on the elements of the gear-pairs chosen under (2). The f(X) value of the ratio can be used to compare the actual with the ideal ratio required for even decrements, ie: at X 11, both actual and ideal are the same, whereas at X 13, actual=11.072 and ideal=11.055. The selection of a judicial y ratio for the 2nd gear-pair of each structure helps in the search for suitable teeth numbers for the elements in the sequence of gear-pairs.

Figure 6:
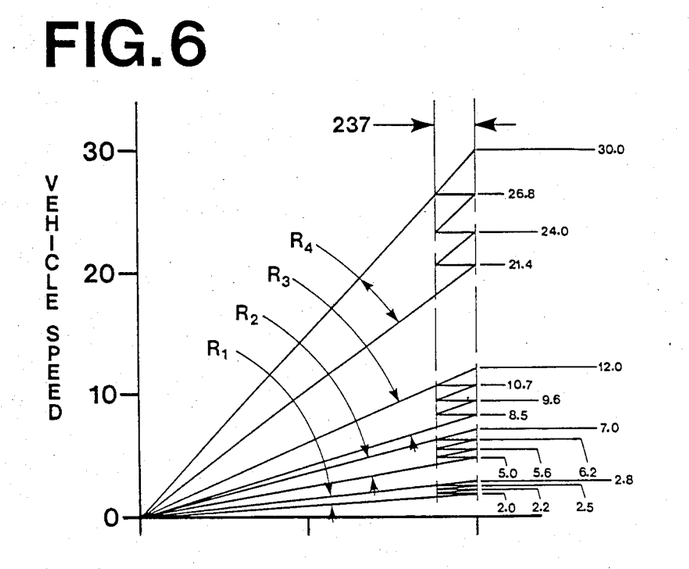
FIG. 6, is a graph showing the projected relationship between the ground speed of a tractor and that of the engine, with a transmission similar to FIG. 3 installed, but with the ratios of the gear-pairs in the second quadriratio structure modified to provide four ground speed operating regimes.

(v) Description of FIG. 6.

FIG. 6, show a graph of the projected broken relationship between ground and engine operating speed for the series structured sixteen ratio transmission of FIG. 3 for an agricultural tractor installation where engine speed is held constant and again the maximum ratio of the transmission is sixteen. As shown the transmission has four vehicle speed regimes $R_4$, $R_3$, $R_2$ and $R_1$, with each speed regime provided with four of the sixteen available ratios of the transmission for the different speed requirements for plowing, harrowing, harvesting, transportation, and other farm operations. Since engine speed is constant and each quadriratio structure is independently operated, the second quadriratio structure is used to select the ground speed regimes for the farm operations while the the first quadriratio structure provides each of the four ratios within the regimes. Accordingly, the quadriratio structure are independently configured with their ratios no longer dependent on an overall transmission sequence, but rather on independent sequences that are designed to provide both the speed regimes and the desired ratio changes within the regime. If we assume a maximum ratio of 1.400 for the first structure with an even decrement in the ratio changes, and a maximum ratio of 10.758 for the second structure with an uneven decrement of ratio changes in compliance with specific farm tractor speed operations, then a suitable configuration for each structure could be as follows:

(1) the basic increment of change X in the ratios of the first quadriratio structure is obtained from equation (3), with the second structure having no compliance to a basic increment of change in the ratios:

$$X = 1.4^{(1/[4-1])} = 1.119$$

(2) the ratios of the gear-pairs in the first structure, with a y rtio of 30/31, are obtained from equation (1). The ratios of the gear-pairs in the second structure are choosen independently to provide the desired tractor speed regimes in conjunction with a specific y ratio:

1st $X * y = 1.083 = 39/36$

2nd $= 0.968 = 30/31$

3rd $X^2/y = 1.293 = 53/41$

4th $= 3.280 = 82/25$

5th $= 1.308 = 51/39$

6th $= 3.280 = 82/25$

Again, the even decrement in the ratio changes of the first structure will cause a drop of $100(X-1)\% = 11.9\%$, or 237 rpm below the 2000 rpm operating speed of the engine each time a higher ratio in the four ratios are selected in each tractor speed regime. The table as shown in (3) of the road installation, will again give the order in the selection of the gear-pairs for both quadriratio structures as the transmission changes from $39/36*53/41*82/25*82/25 = 15.066:1$ to $1:1$ in fifteen steps. The actual values of tractor speed as shown in the graph are obtained by multiplying or dividing as indicated in the binary table, the ratio of the number of teeth on the elements of the gear-pairs is derived under (2). The f(X) value again confirms the actual and ideal values of the ratios in the four ground speed regimes.

(vi) Description of FIGS. 7, and 7a.

FIG. 7, is a hexaratio transmission similar to that of FIG. 2, but incorporating a reverse gear arrangement. All similar components are identified accordingly, with the following changes and components added; gear element 23 of the gear-pair 22-23, has been detached from the cluster shaft 11, provided with a dog d7, and mounted free to rotate independently on bearing rod 13. Reverse gear element 25 is provided with dog d8 and mounted free to rotate on the extension to cluster shaft 11 with external and internal splined ring 26 affixed between the gear elements 23 and 25. A fourth shift fork 3d is mounted free to move axially on rod 14, activated by a fourth profiled slot on shift gate 16 that causes sliding dog coupler 2d to engage gear element 25 with the cluster shaft 11 when a reverse selection is made, and engage gear element 25 to the cluster when a neutral or forward selection is made. A two gear reverse cluster meshes between gear 25 and gear 22 of the gear-pair 22-23, similar to the cluster 20-19 of FIG. 4 but without the sliding dog coupler, with the selection of the remaining gear-pairs of the sequence as specified in the discussion of FIG. 2.

SUMMARY

The preceeding disclosure describes the structures of Incrementally Variable Countershaft Transmissions, and defines the sequence between the ratios of consecutive gear-pairs for any single countershaft transmission, and for any series transmission arrangement of single countershaft structures. Of significance in the disclosure, is the relationship between the numbers of gear-numbers of gear-pairs and the number of ratios-states in the transmissions. Any number of gear-pairs greater than two can be incorporated into a single countershaft structure, with six gear-pairs providing ten ratio-states. However, six gear-pairs in a series transmission consisting of two single structures with three gear-pairs in each will provide sixteen ratio-states. With the addition of three gear-pairs to the series structure forty-eight ratio-states will be provided. Again however, a series structured transmission consisting of three single structures with three gear-pairs in each will provide sixty-four ratios-states, and so on.

The required geometric progression in the ratios of the gear-pairs in a single structure, the required relationship in the geometric progression in the ratios of the gear-pairs of a proceeding structure with the maximum ratio of the structure prior to the addition of a next structure in a transmission with a series of structures, the necessary embodiments on the profiled slots of the shift gate that cause the ratios of the first two gear-pairs to combine in permuted product with those of the remaining gear-pairs in a single structure, providing ratio-states in the continuum of the transmissions with substantially a constant incremental change, is the essence of this disclosure.

What I claim is:

1. Incrementally variable single countershaft transmissions consisting of; single structures having three to five gear-pairs with ratios substantially in the order of the geometric progression, $X^*_{y, y}, X^2/y, X^4/y, X^6/y,$ where y is the ratio of a second gear-pair and both y and X are common constants in the ratios of all other gear-pairs, $$X = R^{1/(2[N-1]-1)},$$

where R is the maximum ratio and N is the number of gear-pairs in the structure, wherein the number of ratio-states T is, $$T = 2[N-1]^5_3,$$

with each said ratio-state defined as a function of X in the following combinations, $$r_{1,2,3,4,\ldots} T = y[X]^1_0 \begin{array}{l} \rightarrow * X^4/y \\ \rightarrow * [X^2/y]^1_0, \\ \rightarrow * X^6/y \end{array}$$

providing either ratio-states $X^3$, $X^2$, X and 1, or $X^5$, $X^4$, $X^3$, $X^2$, X and 1, or $X^7$, $X^6$, $X^5$, $X^4$, $X^3$, $X^2$, X and 1, with respectively three, four and five gear-pairs in the structure; wherefore, said single structures comprise of coaxially mounted input and output shafts with abutting ends concentrically journaled and outer ends with journals in the casing of said transmission; a countershaft mounted free to rotate on a mandrel with ends fixed to said casing adjacent and parallel to said two coaxial shafts; said gear-pairs with ratios $X^*y$ and y being referenced from said input shaft and said gear-pairs with ratios $X^2/y$, $X^4/y$, $X^6/y$ being referenced from said countershaft; with a gear element of said gear-pairs with ratios $X^*y$ and y mounted free to rotate on and provided with a coupling means to said input shaft, and with a gear element of each said gear-pairs with ratios $X^2/y$, $X^4/y$, $X^6/y$ mounted free to rotate on and together with said gear element of said gear-pair with ratio y are provided with a coupling means to said output shaft; and with a second gear element of all said gear-pairs fixed to said countershaft: and a series arrangement of said single structures with the ratios in their said gear-pairs substantially in a progressive relationship as defined by, $$X_u{}^u = r_{u-1}{}^{r*}X,$$

where $X_u{}^u$ is a common constant in the ratios of all but a second gear-pairs in structure u of a series of structures, and $r_{u-1}{}^r$ is the maximum ratio obtained in the said series prior to the addition of structure u, and with the number of ratios $T_s$ in a series of single structures defined by, $$T_s = T_{u-u} \ldots {}^*T_{u-1}{}^*T_u$$

where $T_u$ and $T_{u-1}$ are respectively the last and second to last single structures in the series.

2. A single structure for the transmissions of claim 1 with three gear-pairs, and where said coupling means between said gear elements with ratios $X^*y$ and y and said input shaft is a sliding dog coupler axially movable between mating dogs attached to each of said two elements; said coupling means between said gear elements with ratios y and $X^2/y$ and said output shaft is a second sliding dog coupler axially movable between mating dogs attached to each of said two element; wherein each said sliding dog coupler is provided with a shift fork with axial movement on a rod as caused by profiled slot in a shift gate that together with said rod is held parallel and adjacent to said coaxial shafts by guide brackets of said casing, so that when said shift gate is indexed at right angles to the axis of said rod as caused by a shift lever with interconnecting sector plate rotatably mounted in the upper cover of said casing, said gear-pairs will be made active in the continuum of said transmission in combinations of permuted product that result in substantially the following ratio-states $X^3$, $X^2$, X and 1.

3. A single structure as defined in claim 2, with either four or five gear-pairs, wherein said sliding dog coupler mounted on said output shaft is keyed to a ring with internal and external splines, which is keyed to a first concentric shaft with affixed dogs and free to rotate on said output shaft, with said gear element with ratio $X^2/y$ free to rotate on said concentric shaft between said ring and affixed dogs, and said first concentric shaft being either adjacent to, a third sliding dog coupler keyed to said output shaft and couplable to either said first concentric shaft or to one gear element with ratios $X^4/y$ mounted free to rotate on said output shaft, or, a second concentric shaft with sliding dog coupler, ring and dogs, with a gear element with ratios $X^4/y$ likewise mounted, and a fourth sliding dog coupler keyed to said output shaft and couplable to either said second concentric shaft or to one gear element with said ratio $X^6/y$ mounted free to rotate on said output shaft, and with each added sliding dog coupler provided with a shift fork congruent with a profiled slot on said shift gate, so that when said shift gate is indexed at right angles to the axis of said rod said gear-pairs will be made active in the continuum of said transmission in combinations of permuted product that result in substantially the following ratio-states $X^5$, $X^4$, $X^3$, $X^2$, X and 1, and $X^7$, $X^6$, $X^5$, $X^4$, $X^3$, $X^2$, X and 1 when said structures are respectively four and five gear-pairs.

4. A single structure as defined in claim 2, with a reverse mechanism consisting of, an additional profiled slot on said shift gate, a shift fork and sliding dog coupler with axial movement on said rod and keyed to said countershaft inboard of said last gear element which is detached and free to rotate on said mandrel and provided with dogs; a first reverse gear element with dogs and free to rotate on said countershaft between said coupler and a second to last gear element, therein is provided a spool with two idler gear element free to rotate on a mandrel affixed in said casing, with said one idler gear element congruent to said first reverse gear and said second idler gear element congruent to said last gear element free to rotate on said output shaft; wherefore when said first reverse gear is coupled to said countershaft by said sliding dog coupler a reversing means is provided in said structure.

5. A series structured transmission as claimed in claim 1, with a reverse mechanism consisting of; a first reverse gear element free to rotate on a shift to which is affixed a second reverse gear element, a shift fork and sliding dog coupler with attachment to said shaft and couplable to dogs affixed on said first reverse gear element, with journals on said mechanism in said casing so that said second reverse gear element is congruent to a first gear element affixed to said countershaft of a second structure, and said first reverse gear element is congruent to a last gear element mounted free to rotate on said output shaft of said first structure; so that when said two gear elements of said reverse mechanism are coupled a reversing means is provided in the transmission.

* * * * *